United States Patent [19]

Ogawa et al.

[11] 3,795,404
[45] Mar. 5, 1974

[54] SEALING OF MECHANICAL SEAL AND MANUFACTURE THEREOF

[75] Inventors: Kazuki Ogawa, Fukuoka; Hiroshi Ito, Dazaifu-machi; Mitsuhiko Furukawa, Fukuoka, all of Japan

[73] Assignees: Nippon Tungsten Company, Ltd., Fukuoka-shi; Nippon Pillar Packing Company, Ltd., Osaka-shi, both of, Japan

[22] Filed: May 2, 1972

[21] Appl. No.: 249,669

[52] U.S. Cl. ............................ 277/235 R, 29/420.5
[51] Int. Cl. ............................................. F16j 15/34
[58] Field of Search 277/227, 229, 234, 235, 235 A, 277/236; 75/208, 211; 29/420.5

[56] References Cited
UNITED STATES PATENTS

| | | | |
|---|---|---|---|
| 3,235,346 | 2/1966 | Hucke | 29/420 |
| 3,268,997 | 8/1966 | Miller | 29/420 |
| 3,357,827 | 12/1967 | Naeser et al. | 75/211 |
| 3,551,991 | 1/1971 | Reich et al. | 75/208 R |
| 3,615,901 | 10/1971 | Medicus | 75/208 |
| 3,665,585 | 5/1972 | Dunn et al. | 29/420 |

*Primary Examiner*—Herbert F. Ross
*Assistant Examiner*—Robert I. Smith
*Attorney, Agent, or Firm*—Linton & Linton

[57] ABSTRACT

Seal ring of mechanical seal comprising a basic metal or substrate having a hard metal coating adhered thereto by a sintering process.

2 Claims, 3 Drawing Figures

A: Sulphuric acid
B: Hydrochloric acid
C: Nitric acid

SEALING OF MECHANICAL SEAL AND MANUFACTURE THEREOF

The present invention relates to a mechanical seal, particularly an improved seal ring of the mechanical seal and manufacture thereof.

In a seal ring of the modern mechanical seal, hard metals having excellent corrosion resistance and wear resistance properties have been used, but since the manufacture of a seal ring wholly made of a hard alloy is very expensive, a seal ring of hard metal having a thickness of 2 – 10 millimeters has been usually adhered to a basic metal or substrate ring with a solder or an adhesive, or alternatively by shrink fitting. The production of a seal ring of such a thickness is still comparatively expensive.

Throughout the present specification and claims, the generic term "hard metals" is used to mean alloys such as WC, WC-Co, WC-Ni, TiC, TaC, TiC-Co and TaC-Co alloys.

The above-mentioned manufacturing process is complicated, and the soldering or adhesion of a thin seal ring having an extremely thin thickness to the substrate has been avoided because such process might produce distorsion in the ring, and further, the manufacture of a very thin seal ring is difficult. Additionally it has another disadvantage in that the corrosion resistance property of the ring is reduced by the use of the solder or adhesive.

In the present invention, a sintering process for a hard metal at relatively low temperature is used and the adhesion or coating of a seal ring of the hard metal on the substrate may be easily produced. Furthermore, the operation may be simplified, a very thin coating may be easily obtained, and the process of the present invention provides a seal ring having excellent corrosion resistance and wear resistance properties.

It is an object of the present invention, therefore, to provide a seal ring of a mechanical seal having a very thin coating and excellent corrosion resistance and wear resistance properties and to provide for the manufacture thereof.

It is another object of the invention to provide a manufacturing process wherein the substrate is coated with hard metal particles previously coated with a Ni(92–88%)-P(8–12%) alloy in a weight ratio of 0.3 – 3% by a hot-pressing process simultaneously performing sintering and adhesion. Such hard metal particles may be generally considered as follows: Tungsten Carbide particle including 1 – 30% (by weight) of Co or Ni particle as a binder; TiC particle; TaC particle; and TiC or TaC particle including Co particle as a binder, all these particles being previously coated with 0.3 – 3% of Ni(92–88%)-P(8–12%) alloy.

Another object of the present invention is to provide a manufacturing process for a seal ring of a mechanical seal which comprises the formation of an oxidation preventing layer on a substrate which is made of metal containing chromium, and sintering hard metal particles overlaid on said layer.

The prior art sintering process of a hard metal requires an elevated temperature, for instance, for WC series of over 1650°C, WC-Co series of over 1320°C and for WC-Ni series of over 1324°C, and furthermore, with a steel substrate such simultaneous sintering and adhesion of the alloys was impossible because of the required high temperature.

In accordance with the present invention using WC particles previously coated with Ni(92–88%)-P(8–12%) alloy in a ratio of 0.3 – 3% or WC-Co or WC-Ni series particles previously coated with Ni(92–88%)-P(8–12%) alloy in a similar manner, such simultaneous sintering and adhesion may be practiced at relatively lower temperatures such as 1100° – 1300°C to a seal ring substrate by a hot-pressing process.

Other objects and advantages of the present invention will be understood from the detailed description of the following examples together with the accompanying drawing wherein.

Figure 2:
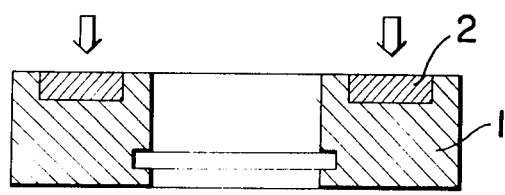
FIG. 2 is an enlarged section showing the coating process of a hard alloy on a seal ring substrate.

Referring to the manufacturing method of the present invention, as shown in FIG. 2, the seal ring substrate 1 of carbon steel or tool steel is formed with an annular groove into which WC-base hard metal particles (2) such as tungsten carbide particles with or without 1–30% of cobalt or nickel particles as a binder are placed. All these particles are previously coated with Ni(92–88%)-P(8–12%) alloy in a weight ratio of 0.3 – 3.0% and are hot-pressed for simultaneous sintering and adhesion to the substrate 1.

When the substrate is a metal containing chromium such as stainless steel, alloy steel or heat-resisting steel, such metals are oxidized at a high temperature. Accordingly, in such a case the substrate should be formed with an oxidation preventing layer for treating at a high-temperature. In other words, the surface of the substrate is subject to Ni-plating, or Ni-P alloy plating treatment or to the application of a paste of Ni-P alloy particles and subsequent heat treatment to form an oxidation preventing layer, and then WC-base hard metal particles such as tungsten carbide particles previously coated with Ni(92–88%)-P(8–12%) alloy with or without cobalt or nickel particles are overlaid on the layer and simultaneously sintered and adhered by hot-pressing.

The layer of the hard alloy is quite thin having a thickness of 0.5 mm.

The restriction of 0.3 – 3.0% of Ni(92–88%)-P(8–12%) alloy used for coating of the particles is based on a fact that with an amount less than 0.3% the sintering process becomes difficult whereas an amount over 3.0% deteriorates the desired wear resistance and corrosion resistance properties.

On the other hand, the restriction of 1 – 30% of cobalt or nickel used as a binder of tungsten carbide particles is based on a fact that an amount less than 1 % is insufficient to function as a binder and an amount over 30 % extremely lowers the desired wear resistance and corrosion resistance properties.

Figure 1:
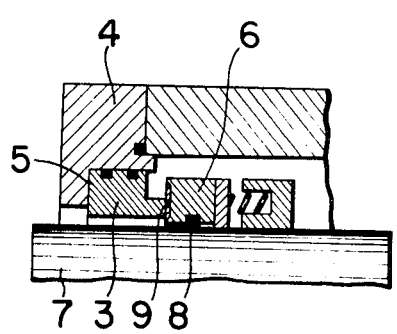
FIG. 1 is section of a mechanical seal including a seal ring in accordance with the present invention.

The use of the seal ring of the present invention is shown in FIG. 1 wherein a sealing contact in a mechanical seal is obtained by a relative movement between a stationary ring 3 mounted in the flange 4 through a gasket 5, and a seal ring 6 fitted to the shaft 7 through an axial packing 8. The seal ring 6 has a hard metal portion 9 adhered to the ring by relatively low temperature diffusive sintering and said portion forms a seal against the end face of the stationary ring.

Figure 3:
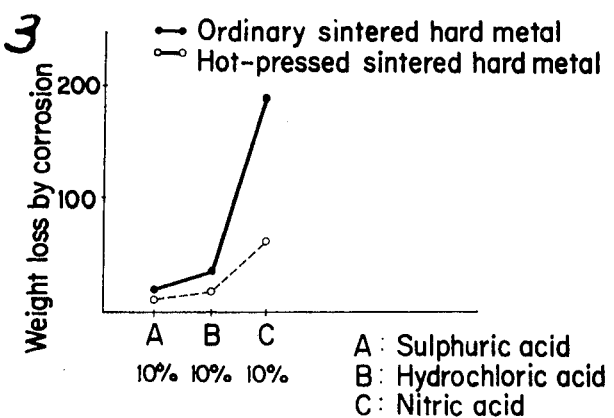
FIG. 3 is a comparative diagram of an acid test on seal rings manufactured by the present invention and that made by a conventional sintering process.

The excellent corrosion resistance property in acid tests of hard metal portion 9 of the seal ring 6 of the present invention is shown in FIG. 3.

The following examples are some illustrative examples of the present invention, not limiting the same.

EXAMPLE 1

A seal ring of this example was produced under the following conditions:
  Hard metal particle: Tungsten carbide particles having an average grain size of 1.0 micron and coated with Ni(92–88%)-P(8–12%) alloy in a weight ratio of 0.5 – 0.65%
  Substrate: Carbon steel JIS S 10C (AISI 1010)
  Hot pressing for sintering and adhesion:
    Sintering temperature: 1200°C
    Sintering time: 20 minutes
    Pressure: 200 Kg/sq. cm No porosity or fine cavity was observed on the product surface and its hardness was 91.8 (HRA). The adhered layer was rigidly applied to the substrate by the diffusive adhesion of the hot-pressing.

EXAMPLE 2

A seal ring of this example was produced under the following conditions:
  Hard metal particles: Tungsten carbide particles having an average grain size of 1.5 microns and coated with Ni(92–88%)-P(8–12%) alloy in a weight ratio of 0.5 – 0.65%.
  Substrate: Tool steel JIS SK 5 (AISI W1)
  Hot pressing for sintering and adhesion:
    Sintering temperature: 1200°C
    Sintering time: 20 minutes
    Pressure: 200 Kg/sq. cm No porosity was observed on the product surface and its hardness was 91.8 (HRA). The adhered layer was rigidly applied to the substrate by the diffusive adhesion of the hot-pressing and had a tensile shearing stress more than 20 Kg/sq. mm.

EXAMPLE 3

A seal ring of this example was produced under the following conditions:
  Hard metal particles: Tungsten carbide particles containing 6% of cobalt particles, both coated with Ni(92–88%)-P(8–12%) alloy in a weight ratio of 0.5 – 0.65% and having an average grain size of 1.5 microns.
  Substrate: Carbon steel JIS S 10C (AISI 1010)
  Hot pressing for sintering and adhesion:
    Sintering temperature: 1200°C
    Sintering time: 20 minutes
    Pressure: 200 Kg/sq. cm No porosity was observed in the product surface as Examples 1 and 2, and its hardness was 91.8 (HRA). The adhered layer was rigidly applied to the substrate by a diffusive adhesion of the hot-pressing.

EXAMPLE 4

A seal ring was prepared under the following conditions:
  Hard metal particle: Tungsten carbide particles coated with Ni(92–88%)-P(8–12%) alloy in a weight ratio of 0.5 – 0.65%, and having an average grain size of 1.0 micron.
  Substrate: Carbon steel JIS S 10C (AISI 1010)
  Oxidation preventing layer: formed by an electroless Ni-P plating in a thickness of 21 microns on the substrate surface.
  Hot pressing for sintering and adhesion:
    Sintering temperature: 1200°C
    Sintering time: 20 minutes
    Pressure: 200 Kg/sq. cm The resulting hard alloy seal ring had a hardness of 91.8 (HRA) without any porosity. The adhered layer was rigidly applied to the substrate by a diffusive adhesion of the hot-pressing.

EXAMPLE 5

Two kinds of seal ring were prepared under the following conditions:
  Hard metal particles: Tungsten carbide particles coated with Ni(92–88%)-P(8–12%) alloy in a weight ratio of 0.5 – 0.65% and having an average grain size of 1.0 micron.
  Substrates: Stainless steel JIS SUS 24 (AISI 430)
    Stainless steel JIS SUS 27 (AISI 304)
  Oxidation preventing layer: formed by an electrical plating of nickel in a thickness of 0.1 mm on the substrate surface.
  Hot pressing for sintering and adhesion:
    Sintering temperature: 1200°C
    Sintering time: 20 minutes
    Pressure: 200 Kg/sq. cm The hard metal particles were diffusively adhered to these substrates. No porosity was observed on the surface of the product which had a hardness of 92.0 (HRA).

The seal ring of this example mounted in a mechanical seal was tested under the following condition:
  Contact pressure: 5 Kg/sq. cm
  Fluid: Water
  Revolution: 3600 rpm
  Mating material: carbon
  Testing time: 100 hours.

After the test, the wear of the carbon was 2 microns, whereas any appreciable wear could not observed in the hard alloy exhibiting an excellent property.

EXAMPLE 6

A seal ring of this example was prepared under the following conditions:
  Hard metal particles: Tungsten carbide particles coated with Ni(92–88%)-P(8–12%) alloy in a weight ratio of 0.5 – 0.65%, and having an average grain size of 1.5 microns.
  Substrate: Stainless steel JIS SUS 27 (AISI 304)
  Oxidation preventing layer: formed by an application of paste of Ni-P alloy particles (average grain size: 6 microns) with turpentine oil on the substrate surface.
  Hot pressing for sintering and adhesion:
    Sintering temperature: 1200°C
    Sintering time: 20 minutes
    Pressure: 200 Kg/sq. cm The hard alloy particles were rigidly applied to the substrate by the diffusive adhesion of the hot-pressing without any appreciable porosity, and its hardness was 92.0 (HRA).

The seal ring of the mechanical seal prepared in accordance with the present invention has a layer of hard alloy particle rigidly applied on a substrate surface by a diffusive adhesion of the hot-pressing at relatively lower temperature, providing a high bonding strength, and due to a fact that no solder or adhesive agent is used in the sintering process, an improved corrosion resistance and wear resistance properties are obtained than that obtained is the prior art processes.

EXAMPLE 7

A seal ring of this example was prepared under the following conditions:
 Hard metal particles: Tungsten carbide particles containing 10% of nickel particles, both coated with Ni(92–88%)-P(8–12%) alloy in a weight ratio of 0.5 – 0.65%.
 Substrate: Carbon steel JIS S 10C (AISI 1010)
 Hot pressing for sintering and adhesion:
  Sintering temperature: 1200°C
  Sintering time: 20 minutes
  Pressure: 200 Kg/sq. cm No porosity was observed in the product surface and the adhered layer was rigidly applied to the substrate by a diffusive adhesion of the hot-pressing.

The seal ring of the mechanical seal in accordance with the present invention is consisting of a seal ring substrate and hard metal particles adhered thereon by a diffusive adhesion of the hot-pressing at relatively low temperature which provides a rigid joint therebetween, and has an excellent anti-corrosion property without any use of a soldering agent or adhesive. The wear resistance property together with the above-mentioned corrosion resistance property of the seal ring of the present invention have been proved superior than that of the prior art seal rings.

While the seal ring is shown in a rotating side in FIG. 1, the same effect may be obtained when used in a stationary side.

What is claimed is:

1. A seal ring of a mechanical seal comprising a seal ring substrate of ferrous metal, hard metal particles overlaid and adhered by hot-pressing on said seal ring substrate, and said hard metal particles having a coating of Ni(92–88%) - P(8–12%) alloy in a weight ratio of 0.3 – 3%.

2. A seal ring of a mechanical seal comprising an oxidation preventing layer formed on the surface of a substrate containing chromium metal by Ni-plating, Ni-P alloy plating or an application of a paste of Ni-P alloy particles, hard metal particles overlaid and adhered by hot-pressing on said layer, and said hard metal particles being coated with Ni(92–88%) - P(8–12%) alloy in a weight ratio of 0.3 – 3%.

* * * * *

UNITED STATES PATENT OFFICE
CERTIFICATE OF CORRECTION

Patent No. 3,795,404      Dated March , 1974

Inventor(s) Kazuki Ogawa et al.

It is certified that error appears in the above-identified patent and that said Letters Patent are hereby corrected as shown below:

On the Title Page, in item [54] the title should read

-- Seal Ring Of A Mechanical Seal --.

Signed and sealed this 10th day of December 1974.

(SEAL)
Attest:

McCOY M. GIBSON JR.      C. MARSHALL DANN
Attesting Officer      Commissioner of Patents